US009663097B2

(12) United States Patent
Yamazaki et al.

(10) Patent No.: US 9,663,097 B2
(45) Date of Patent: May 30, 2017

(54) METHODS AND SYSTEM FOR LAUNCHING A HYBRID VEHICLE

(71) Applicant: Ford Global Technologies, LLC, Dearborn, MI (US)

(72) Inventors: Mark Steven Yamazaki, Canton, MI (US); Wei Liang, Farmington Hills, MI (US); Xiaoyong Wang, Novi, MI (US); Rajit Johri, Ann Arbor, MI (US); Jeffrey Allen Doering, Canton, MI (US); Ming Lang Kuang, Canton, MI (US); Chen Zhang, Westland, MI (US); Scott James Thompson, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 14/465,639

(22) Filed: Aug. 21, 2014

(65) Prior Publication Data

US 2016/0052509 A1 Feb. 25, 2016

(51) Int. Cl.
*B60W 10/00* (2006.01)
*B60W 10/08* (2006.01)
*B60W 10/02* (2006.01)
*B60W 10/06* (2006.01)
*B60W 10/10* (2012.01)
(Continued)

(52) U.S. Cl.
CPC ............. *B60W 10/08* (2013.01); *B60K 6/387* (2013.01); *B60K 6/48* (2013.01); *B60K 6/547* (2013.01); *B60W 10/02* (2013.01); *B60W 10/06* (2013.01); *B60W 10/10* (2013.01); *B60W 10/115* (2013.01); *B60W 10/30* (2013.01); *B60W 20/1084* (2013.01); *B60W 20/40* (2013.01); *B60W 30/184* (2013.01); *B60W 30/18027* (2013.01); *B60W 30/1846* (2013.01); *B60K 2006/268* (2013.01); *B60K 2006/4825* (2013.01); *B60W 2510/081* (2013.01); *B60W 2510/1005* (2013.01); *B60W 2510/244* (2013.01); *B60W 2540/10* (2013.01); *B60W 2710/081* (2013.01); *B60W 2710/082* (2013.01); *B60W 2710/1083* (2013.01);
(Continued)

(58) Field of Classification Search
CPC .................. B60W 30/18018; B60W 30/18027
See application file for complete search history.

(56) References Cited

U.S. PATENT DOCUMENTS

2002/0179047 A1  12/2002  Hoang et al.
2013/0296106 A1  11/2013  Dai et al.
(Continued)

OTHER PUBLICATIONS

Connolly, Francis T. et al., "Methods and System for Improving Launching of a Hybrid Vehicle," U.S. Appl. No. 14/465,664, filed Aug. 21, 2014, 33 pages.

*Primary Examiner* — Derek D Knight
(74) *Attorney, Agent, or Firm* — David Kelley; McCoy Russell LLP

(57) ABSTRACT

Systems and methods for improving launching of a stopped hybrid vehicle are presented. The systems and methods adjust speed of a motor to reduce the possibility of noticeable impact between driveline gears during vehicle launch. In one example, motor speed is adjusted to a pump pressurization speed where driveline components may be moved to reduce impact between driveline gears during vehicle launch.

20 Claims, 4 Drawing Sheets

(51) Int. Cl.
*B60W 20/00* (2016.01)
*B60W 20/40* (2016.01)
*B60W 30/18* (2012.01)
*B60W 30/184* (2012.01)
*B60K 6/387* (2007.10)
*B60K 6/48* (2007.10)
*B60K 6/547* (2007.10)
*B60W 10/115* (2012.01)
*B60W 10/30* (2006.01)
*B60K 6/26* (2007.10)

(52) U.S. Cl.
CPC ........ *Y02T 10/6221* (2013.01); *Y02T 10/6252* (2013.01); *Y02T 10/6286* (2013.01); *Y10S 903/93* (2013.01)

(56) References Cited

U.S. PATENT DOCUMENTS

| | | |
|---|---|---|
| 2013/0297118 A1 | 11/2013 | Reed et al. |
| 2013/0297123 A1* | 11/2013 | Gibson ............ B60W 20/1084 701/22 |
| 2013/0297160 A1 | 11/2013 | Kar et al. |

* cited by examiner

METHODS AND SYSTEM FOR LAUNCHING A HYBRID VEHICLE

FIELD

The present description relates to methods and a system for launching a hybrid vehicle from rest after an engine and electric machine in the hybrid vehicle have stopped rotating. The methods may be particularly useful for hybrid vehicles that include a torque converter and an automatic transmission.

BACKGROUND AND SUMMARY

A hybrid vehicle may include an electric machine and an engine. The engine may be selectively stopped and started based on vehicle operating conditions. The electric machine may propel the hybrid vehicle when the engine has stopped rotating to conserve hydrocarbon based fuel. However, it may also be desirable at selected times to cease torque output from the electric machine and stop the electric machine from rotating while the vehicle remains activated. For example, it may be desirable to stop electric machine rotation and torque output when the hybrid vehicle is stopped for an extended period of time. The electric machine may be stopped to conserve electrical energy stored onboard the hybrid vehicle. Current flow to the electric machine may be stopped to stop the electric machine. Consequently, both hydrocarbon based fuel and stored electrical energy may be conserved during some driving conditions.

However, if the engine and the electric machine are stopped from rotating, spaces between gear surfaces within the hybrid driveline may open up. Further, application of gear clutches may not be maintained and space and/or a reduction in application force may develop between clutch friction surfaces if oil pressure in the vehicle's transmission is reduced in response to a lack of transmission pump output during the time the electric machine and engine are stopped. If the electric machine is accelerated to engine idle speed to start the engine in response to a driver demand or other conditions, the vehicle driver may notice torque being transmitted through the transmission and to vehicle wheels. In particular, the driver may notice the gear clutch engaging and impact between driveline gear teeth as the electric machine accelerates to provide the desired driver demand torque. Therefore, it would be desirable to provide a way of reducing the possibility of such driveline torque disturbances.

The inventors herein have recognized the above-mentioned disadvantages and have developed a driveline method, comprising: adjusting an electric machine from zero speed to a first speed in response to a request to propel a vehicle and driveline lash; adjusting the electric machine to a second speed after achieving the first speed in response to the request to propel the vehicle.

By rotating the electric machine at a speed that provides pressure to fill a torque converter and close gear clutches but that is slow enough to limit torque transfer through a transmission, it may be possible to provide the technical result of reducing impact between gears and reducing driveline torque disturbances. In particular, the electric machine speed may be increased from zero speed to a first speed where a transmission pump pressurizes transmission fluid to a level sufficient to begin closing gear clutches and that allows torque to be transmitted from the torque converter impeller to the torque converter turbine. The first speed is may be a speed where the torque converter efficiency is less than a threshold efficiency or a speed where the torque converter transmits less than a threshold amount of torque. In this way, a small amount of torque may be transferred through the transmission to reduce gaps between meshing surfaces before an amount of torque sufficient to move the vehicle is transferred through the driveline. Consequently, the possibility of driveline torque disturbances may be reduced.

The present description may provide several advantages. For example, the approach may reduce driveline torque disturbances. Additionally, the approach may reduce wear of driveline components. Further, the approach may improve acceptance of stopping the electric machine to improve vehicle efficiency.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
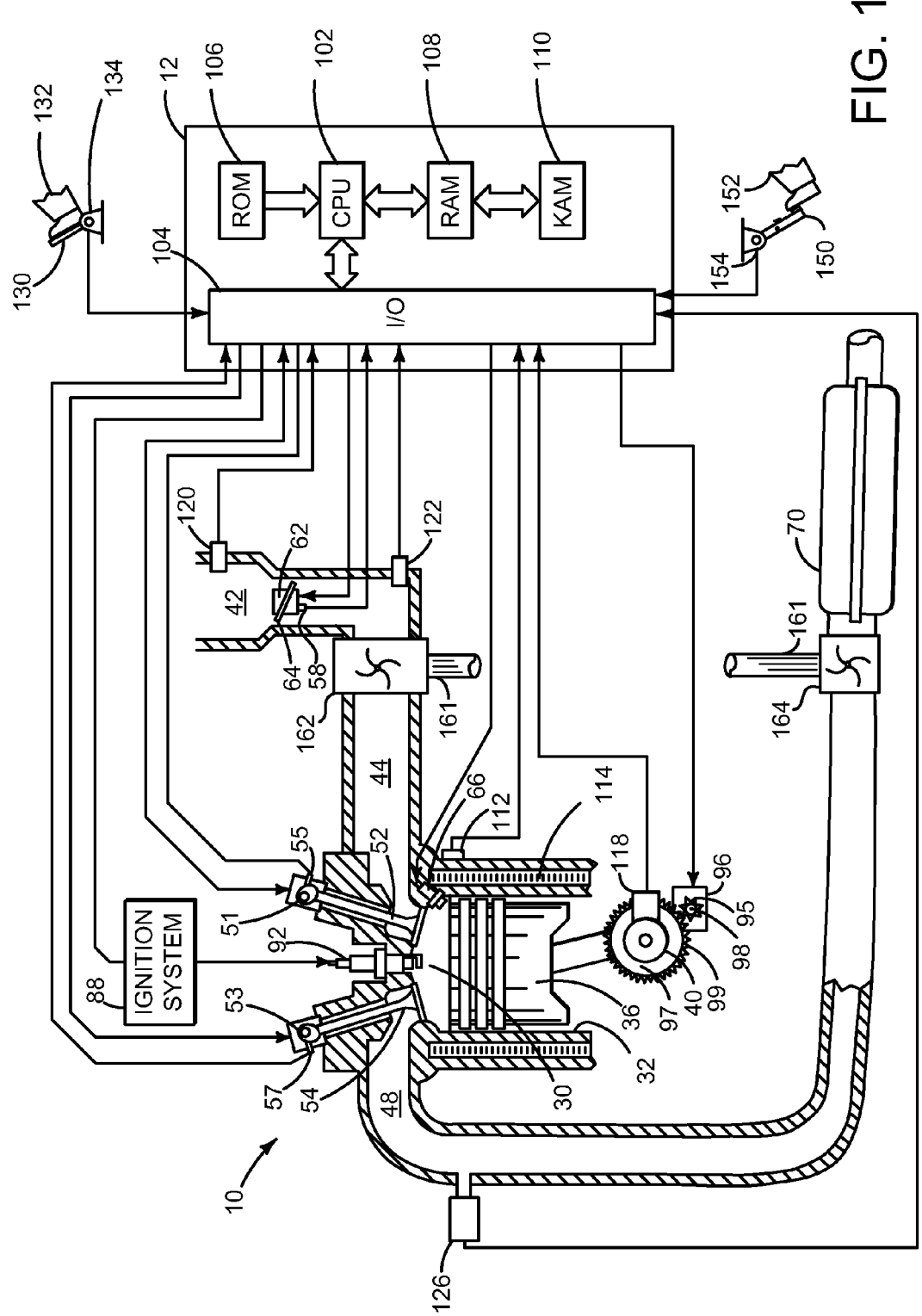
FIG. 1 is a schematic diagram of an engine.
Figure 2:
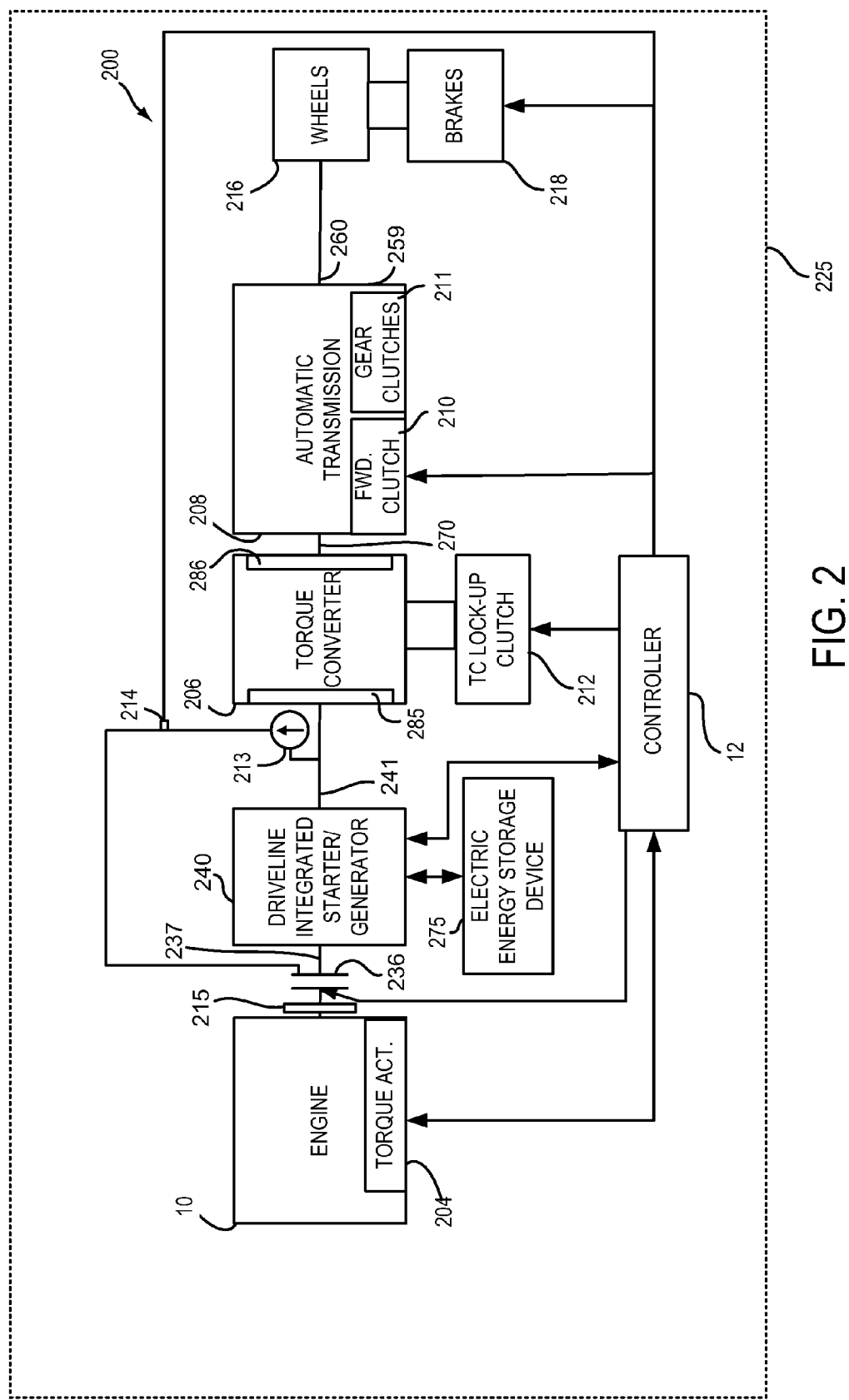
FIG. 2 shows an example vehicle driveline configuration.
Figure 3:
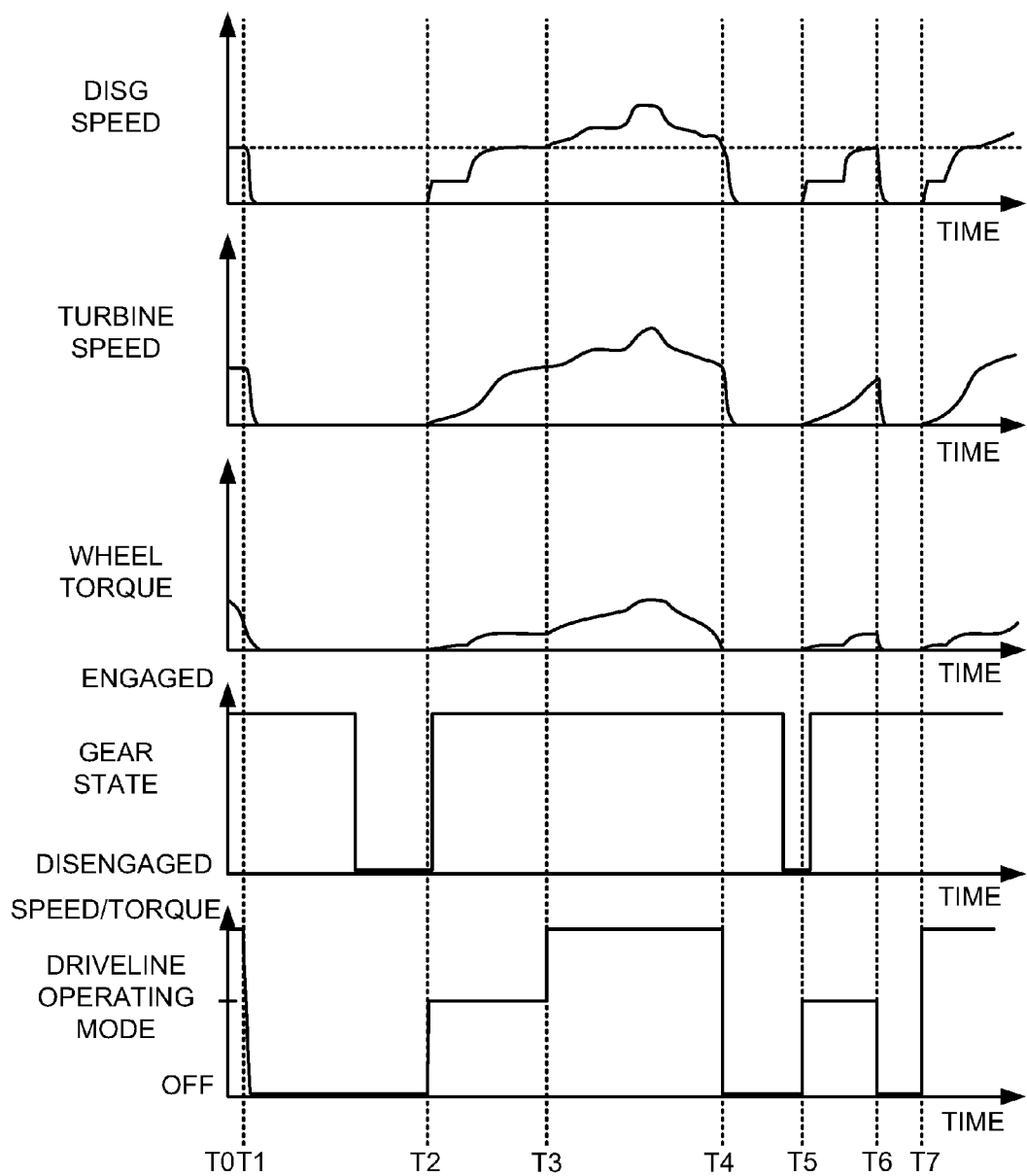
FIG. 3 shows example vehicle launch sequences.

The present description is related to improving a vehicle launch from stop. An engine as is shown in FIG. 1 may be included in the vehicle. Further, the engine may be included in a driveline of a hybrid vehicle as is shown in FIG. 2. The vehicle may launch from stopped conditions as is shown in the sequences of FIG. 3. The vehicle may include a controller that includes instructions according to the method of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In addition, intake manifold 44 is shown communicating with turbocharger compressor 162. Shaft 161 mechanically couples turbocharger turbine 164 to turbocharger compressor 162. Optional electronic throttle 62 adjusts a position of throttle plate 64 to control air flow from air intake 42 to compressor 162 and intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through dual mass flywheel 215. Disconnect clutch 236 may be electrically or hydraulically actuated. If disconnect clutch 236 is hydraulically actuated, pump 213 supplies working fluid (e.g., oil) to driveline disconnect clutch 236. Pump 213 may be incorporated into torque converter 206 or transmission 208, and pump 213 rotates to supply pressurized working fluid to driveline disconnect clutch 236 and clutches 210-211. Pump 213 is mechanically driven and it rotates to pressurize working fluid when shaft 241 rotates. Pressure at an outlet of pump 213 may be determined via pressure sensor 214. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 (e.g., high voltage battery or power source) may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Thus, the system of FIGS. 1 and 2 provides for a driveline system, comprising: an engine; an electric machine; a driveline disconnect clutch positioned between the engine and the electric machine; and a controller including executable instructions stored in non-transitory memory for adjusting the electric machine from zero speed to a first speed in response to a request to propel a vehicle and a gear clutch being at least partially open. The driveline system further comprises additional instructions for ramping the electric machine to a second speed in response to output pressure of a transmission pump. The driveline system further comprises additional instructions for closing the driveline after the electric machine achieves the second speed. The driveline system includes where the driveline disconnect clutch is open when the electric machine is adjusted from zero speed to the first speed. The driveline system further comprises additional instructions for adjusting the electric machine from zero speed to the first speed in response to the request to propel the vehicle and driveline lash.

Figure 4:
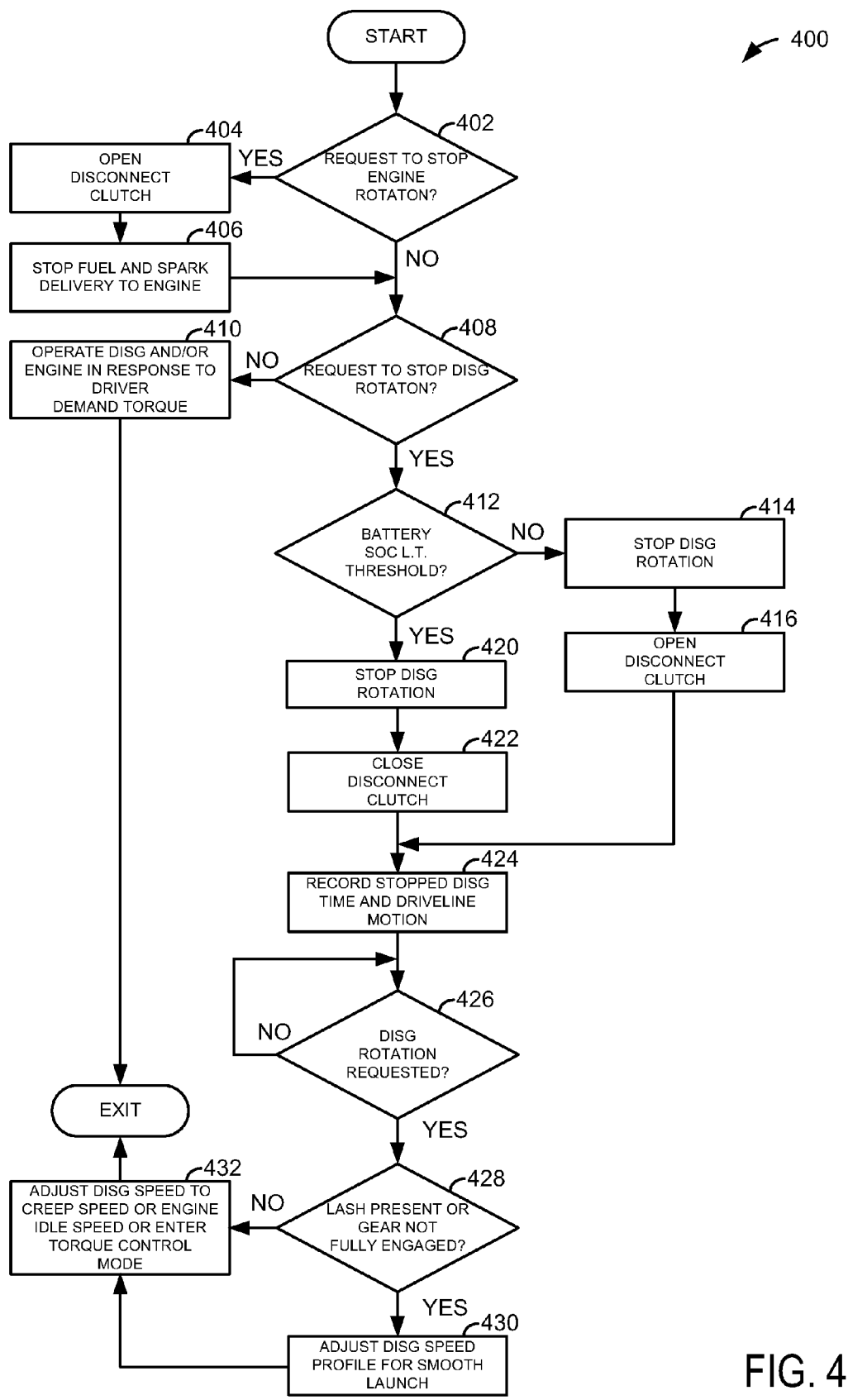
FIG. 4 shows an example method for improving vehicle launches.

Referring now to FIG. 3, several vehicle launch sequences according to the method of FIG. 4 are shown. The sequences of FIG. 3 may be provided by the system of FIGS. 1 and 2 executing the method of FIG. 4.

The first plot from the top of FIG. 3 is a plot of electric machine (DISG) speed versus time. The DISG speed increases in the direction of the Y axis arrow. The X axis represents time and time increases from the left side of FIG. 3 to the right side of FIG. 3. The Y axis represents speed and speed increases in the direction of the Y axis arrow.

The second plot from the top of FIG. 3 is a plot of torque converter turbine speed versus time. The Y axis represents torque converter turbine speed and torque converter speed increases in the direction of the Y axis arrow. The X axis represents time and time increases from the left side of FIG. 3 to the right side of FIG. 3.

The third plot from the top of FIG. 3 is a plot of wheel torque versus time. The Y axis represents wheel torque and wheel torque increases in the direction of the Y axis arrow. The X axis represents time and time increases from the left side of FIG. 3 to the right side of FIG. 3.

The fourth plot from the top of FIG. 3 is a plot of transmission gear state versus time. The Y axis represents transmission gear state and a transmission gear is fully engaged when the gear state trace is near the Y axis arrow. A transmission gear is not fully engaged when the gear state trace is near the X axis. A gear state may be determined via pressure of oil supplied to a gear clutch. The transmission gear state represents states of all transmission forward gears (e.g., gears 1-10). Thus, if gear one or gear 6 is fully applied, the gear state is at a high level. However, in this particular example, only gear number one is activated or not activated for improving sequence interpretation. The X axis represents time and time increases from the left side of FIG. 3 to the right side of FIG. 3.

The fifth plot from the top of FIG. 3 is a plot of driveline operating mode versus time. The driveline may be off, in creep mode, or in speed/torque control mode. The engine and the DISG are stopped and not rotating under their own power when the driveline mode is off. The engine and/or the DISG may be in speed controlled or torque controlled when the driveline is in the speed/torque mode. In speed mode, DISG and/or engine speed are controlled to a desired speed while DISG and/or engine torque is allowed to vary. The engine and/or DISG may be in a creep mode when the driveline operating mode trace is at a middle level between the X axis and the Y axis arrow. The engine and/or DISG may be in speed/torque mode when the driveline operating mode trace is at a higher level near the Y axis arrow. The engine and/or DISG may be off when the driveline operating mode trace is at a lower level near the X axis. The Y axis represents driveline mode. The X axis represents time and time increases from the left side of FIG. 3 to the right side of FIG. 3.

At time T0, the DISG speed is at a lower middle level and the torque converter turbine speed is at a lower level. The wheel torque is zero and first gear is engaged. The driveline operating mode is speed/torque where the engine and/or DISG may respond to driver demand torque input to the vehicle accelerator pedal. Such conditions may be indicative of when a vehicle is stopped for a traffic light or other such similar condition.

At time T1, the DISG speed is reduced toward zero speed in response to the driveline operating mode transitioning to the off state. The driveline operating mode may transition to the off state in response to a request by a controller to reduce energy consumption while the vehicle is stationary and when the driver demand torque is low. The torque converter turbine speed also is reduced in response to the DISG speed decreasing. The wheel torque is reduced toward zero in response to the torque converter turbine speed being reduced. Further, the gear remains in an engaged state so that torque may be applied to the vehicle's wheels if the driver demand torque is increased at a later time.

Between time T1 and time T2, the gear state transitions from engaged to disengaged. A transmission gear may change state from fully engaged to disengaged or partially engaged if pressure in the transmission fluid lines decays over time. In one example, transmission line pressure or clutch pressure may be determined and the gear state may be adjusted based on the pressure of oil supplied to the clutch. In this example, the oil pressure supplied to the clutch decays over time causing the gear state to change from engaged to disengaged. Similarly, lash (e.g., space between gear contacting surfaces) may develop after the engine and DISG are stopped because the two torque sources are not applying positive torque to the driveline when the driveline operating mode is off.

At time T2, the driveline operating mode transitions from off to creep. In creep a small torque is transmitted from the engine or DISG to the torque converter impeller to propel the vehicle at a low speed (e.g., less than 8 KPH). The driveline may enter creep in response to a driver releasing a brake pedal and not applying or depressing the accelerator a small amount. The DISG speed is increased to a first speed in response to the driveline mode transitioning to creep. The first speed may be a transmission pressurization speed, a lowest torque converter impeller speed at which a transmission pump outputs transmission fluid at a desired pressure sufficient to fill the torque converter and/or close transmission gear clutches at a predetermined pump flow rate. Further, the DISG rotates the transmission impeller at a speed where transmission efficiency is less than a threshold efficiency or a transmission impeller speed where the torque converter transmits less than a threshold amount of torque at the present torque converter turbine speed. The increase in DISG speed increases transmission pump output pressure allowing the torque converter to fill and the gear clutch to fully close as indicated by the gear state transitioning to a higher level. The torque converter turbine speed begins to increase slowly allowing a small amount of torque to be transmitted to the transmission input shaft, thereby beginning to increase the wheel torque. In this way, space between gears (e.g., gear lash) and space between gear friction surfaces may be reduced before sufficient torque to move the vehicle is transferred to the vehicle's wheels.

Between time T2 and T3, the DISG speed is increased to a second speed. In this example, the second speed may be a desired engine idle speed. The DISG speed may be increased after a predetermined amount of time after the first DISG speed after DISG stop is reached. Alternatively, DISG speed may be increased in response to an indication that lash is reduced and/or the gear clutch is fully applied. The gear clutch may be determined to be fully applied when a pressure of fluid supplied to the gear clutch is a predetermined pressure. Lash may be determined to be reduced based on a change in position of the driveline. For example, an output shaft of a transmission may rotate a few degrees. The torque converter turbine speed increases in response to the DISG speed increasing, and the wheel torque increases in response to the increase in DISG speed. The gear remains fully engaged and the driveline operating mode remains in creep.

At time T3, the driveline operating mode transitions to speed/torque control in response to an increase in driver demand torque (not shown). The DISG speed increases in response to the increase in driver demand torque and the torque converter turbine speed increases in response to the increase in DISG speed (note that DISG speed equals torque converter impeller speed since the DISG is coupled to the torque converter impeller). The gear remains engaged and wheel torque increases as torque converter turbine speed increases.

At time T4, the driver demand torque is reduced and the vehicle is stopped (not shown). A request to stop DISG rotation is initiated in response to the vehicle being stopped (not shown). The DISG speed is reduced to zero in response to the request to stop DISG rotation. Torque converter turbine speed and wheel torque are also reduced in response to the DISG speed being reduced. The gear remains engaged in case driver demand is increased so that the vehicle may launch more promptly. The driveline operating mode transitions from speed/torque to off in response to the request to stop DISG rotation.

Between time T4 and time T5, the gear state transitions from engaged to disengaged. The other vehicle conditions remain at their same levels.

At time T5, the driveline operating mode transitions into creep mode. The driveline operating mode may transition into creep in response to releasing a brake pedal. The DISG speed is increased to a first speed. The first speed may be a same first speed as at time T2 or the first speed may be adjusted in response to ambient temperature, transmission oil temperature, and other conditions. The first speed may be a transmission pressurization speed, a lowest torque converter impeller speed at which a transmission pump outputs transmission fluid at a desired pressure sufficient to fill the torque converter and/or close transmission gear clutches at a predetermined pump flow rate. Further, the DISG rotates the transmission impeller at a speed where transmission efficiency is less than a threshold efficiency or a transmission impeller speed where the torque converter transmits less than a threshold amount of torque at the present torque converter turbine speed. The increase in DISG speed increases transmission pump output pressure allowing the torque converter to fill and the gear clutch to fully close as indicated by the gear state transitioning to a higher level. The torque converter turbine speed begins to increase in response to the increase in DISG speed. The wheel torque beings to increase in response to the torque converter turbine speed increasing, and the gear state changes from not engaged to engaged in response to the DISG speed reaching the first speed.

Between time T5 and time T6, the DISG speed is increased to a second speed (e.g., a desired engine idle speed). The DISG speed may be increased after a predetermined amount of time after the first DISG speed after DISG stop is reached. Alternatively, DISG speed may be increased in response to an indication that lash is reduced and/or the gear clutch is fully applied. The gear remains fully engaged and the driveline operating mode remains in creep.

At time T6, the driver has reapplied the brake (not shown) and the driveline operating mode transitions to off in response to the brake being reapplied. The DISG speed is reduced to zero in response to the driveline operating mode transitioning to off. The torque converter turbine speed is reduced to zero in response to the DISG speed being reduced to zero, and the wheel torque is reduced to zero since the torque converter turbine speed is reduced to zero. The gear remains in an engaged state.

At time T7, the driveline operating mode transitions to speed/torque mode in response to an increase in driver demand torque (not shown). The DISG speed is increased to a first speed. The first speed may be a transmission pressurization speed, a lowest torque converter impeller speed at which a transmission pump outputs transmission fluid at a desired pressure sufficient to fill the torque converter and/or close transmission gear clutches at a predetermined pump flow rate. Further, the DISG rotates the transmission impeller at a speed where transmission efficiency is less than a threshold efficiency or a transmission impeller speed where the torque converter transmits less than a threshold amount of torque at the present torque converter turbine speed. The increase in DISG speed increases transmission pump output pressure allowing the torque converter to fill and the gear clutch to fully close as indicated by the gear state transitioning to a higher level. The torque converter turbine speed increases in response to the increase in DISG speed. Further, the wheel torque increases to a small positive torque. The gear remains engaged. Shortly after time T7, the DISG transitions to a second speed. The DISG transitions to a second speed sooner than the time difference between transitioning from the first DISG speed at time T2 to the second DISG speed following time T2 because the transmission gear remained engaged and only a small amount of lash was taken up by operating the DISG at the first speed.

In this way, it may be possible to reduce driveline torque disturbance by reducing gear lash and fully engaging transmission gear clutch before applying a threshold amount of torque to the driveline. The threshold amount of torque may be a minimum amount of torque to move the vehicle from a stopped state to a moving state. Further, the DISG may be operated at a first speed for different durations of time so that a smooth vehicle launch may be provided during varying vehicle operating conditions.

Referring now to FIG. 4, a method for launching a hybrid vehicle is shown. The method of FIG. 4 may provide the operating sequence shown in FIG. 3. Additionally, the method of FIG. 4 may be included in the system of FIGS. 1 and 2 as executable instructions stored in non-transitory memory.

At 402, method 400 judges if there is a request to stop engine rotation. A request to stop engine rotation may be made by a controller in response to vehicle operating conditions. In one example, the engine may be requested to stop in response to a low driver demand torque at low vehicle speeds. A driver demand torque may be determined based on accelerator pedal position and vehicle speed. By stopping the engine during periods of low driver demand torque, it may be possible to conserve fuel. If method 400 judges that an engine stop request is present, the answer is yes and method 400 proceeds to 404. Otherwise, the answer is no and method 400 proceeds to 408.

At 404, method 400 opens the driveline disconnect to decouple the engine from the DISG. Decoupling the engine from the DISG allows the DISG to rotate without having to provide torque to rotate the engine and propel the vehicle. Method 400 proceeds to 406 after the driveline disconnect clutch begins to open.

At 406, method 400 ceases spark and fuel delivery to the engine and the engine stops rotating. In some examples, the spark and fuel delivery may stop at predetermined times to improve position control of where the engine stops rotating. Method 400 proceeds to 408 after spark and fuel delivery to the engine are stopped.

At 408, judges if there is a request to stop electric machine or DISG rotation. The DISG may be requested to stop rotating during a vehicle stop where driver demand torque is less than a threshold torque or during other conditions. Since the DISG is coupled to the torque converter impeller, the torque converter impeller does not rotate if the DISG stops rotating. The engine may continue to rotate by opening the driveline disconnect clutch, if desired. If method 400 judges that there is a request to stop the DISG, the answer is yes and method 400 proceeds to 412. Otherwise, the answer is no and method 400 proceeds to 410.

At 410, method 400 operates the DISG and/or engine in response to driver demand torque and other vehicle conditions. For example, the DISG and/or engine may be operated in torque control mode where DISG and/or engine speed is allowed to vary while DISG and/or engine torque is adjusted to meet a desired torque. Alternatively, the DISG and/or engine may be operated in speed control mode where DISG and/or engine speed is controlled to a desired speed and where DISG and/or engine torque is allowed to vary. Method 400 proceeds to exit after the DISG and/or engine are operated according to driver demand torque and vehicle conditions.

At 412, method 400 judges whether or not battery state of charge (SOC) is less than (L.T.) a threshold SOC. In some examples, the threshold SOC may vary for vehicle operating conditions. For example, the threshold SOC may be greater at lower ambient temperatures than the threshold SOC for higher ambient temperatures. If method 400 judges that battery SOC is less than a threshold, the answer is yes and method 400 proceeds to 430. Otherwise, the answer is no and method 400 proceeds to 416.

At 414, method 400 stops the DISG from rotating by ceasing current flow to the DISG. Method 400 proceeds to 416 after ceasing to supply current to the DISG.

At 416, method 400 opens the driveline disconnect clutch. The driveline disconnect clutch is opened since SOC is high and it may be anticipated that the engine need not be immediately restarted when driver demand torque increases. Method 400 proceeds to 424 after the driveline disconnect clutch begins to open.

At 420, DISG rotation is stopped. DISG rotation is stopped by ceasing current flow to the DISG. Method 400 proceeds to 422 after current flow to the DISG ceases.

At 422, the driveline disconnect clutch is closed in anticipation that the engine will be restarted, if the engine is stopped, when DISG rotation resumes. However, if the driveline disconnect is open to allow the engine to continue combusting air-fuel mixtures, the driveline disconnect clutch may remain open.

Thus, the driveline disconnect clutch may be opened or closed while the DISG is stopped based on anticipation or expectation that the engine will or will not be restarted when DISG rotation resumes to recharge the battery. By closing the driveline disconnect clutch as the DISG stops rotating, it may be possible to reduce engine starting time since the DISG clutch does not have to be closed before cranking the engine.

At 424, method 400 begins counting time since DISG rotation stopped. The amount of time may be a basis for determining if clutch pressures have been reduced from bleed down of oil pressure during the time DISG rotation is stopped. In some examples, oil pressure may be reduced over time when the transmission pump is not rotating and activated due to stopping of the DISG. Further, method 400 may record driveline position at the time the DISG is stopped to predict or estimate the presence of driveline lash. Method 400 proceeds to 426 after recording DISG stop time and driveline stop position.

At 426, method judges whether or not DISG rotation is requested so that the vehicle may be propelled. DISG rotation may be requested in response to a driver releasing a brake pedal and/or the driver applying the accelerator pedal more than a predetermined amount. If method 400 judges that DISG rotation is requested, the answer is yes and method 400 proceeds to 428. Otherwise, the answer is no and method 400 returns to 426.

At 428, method 400 judges whether or not driveline gear lash and/or one or more gear clutches are not engaged when it is desired that the gear clutch be fully engaged. In one example, method 400 judges if gear clutches are engaged based on oil pressure supplied to the gear clutches. Further, method 400 judges if there may be gear lash based on a change in position of one or more portions of the driveline. For example, method 400 may determine changes in stopping positions of the transmission input shaft and the transmission output shaft to estimate if gear lash is present. In one example, an amount of driveline lash is estimated via subtracting a driveline position estimated after receiving the request to propel the vehicle when the vehicle is not moving from a driveline position estimated at a time the engine speed first reaches zero. The speed of the electric machine is adjusted from zero to the first speed in response to the amount of driveline lash exceeding a threshold value. Further, the speed of the electric machine is adjusted from zero to the engine idle speed without remaining at the first speed for a predetermined duration in response to the amount of driveline lash not exceeding the threshold value. Thus, if a position of a driveline component has change by more than a threshold amount, it may be judged that gear lash is present.

If method judges that gear lash is present, the answer is yes and method 400 proceeds to 430. Otherwise, the answer is no and method 400 proceeds to 432.

At 430, method 400 adjusts DISG speed from zero speed according to one or more profiles to provide a smooth vehicle launch. In one example, a DISG speed profile accelerates the DISG to a first speed, the first speed may be a transmission pressurization speed (e.g., a lowest torque converter impeller speed at which a transmission pump outputs transmission fluid at a desired pressure sufficient to fill the torque converter and/or close transmission gear clutches at a predetermined pump flow rate). Further, the DISG rotates the transmission impeller at the first speed where transmission efficiency is less than a threshold efficiency or the first speed may be a transmission impeller speed where the torque converter transmits less than a threshold amount of torque at the present torque converter turbine speed.

Once the DISG reaches the first speed, the DISG speed may be held constant at the first speed until a predetermined condition occurs. For example, the DISG speed may be held at the first speed until a pressure in the transmission reaches a threshold level. The pressure in the transmission may be a pump outlet pressure, a line pressure, a clutch pressure, or other some other pressure. Alternatively, the DISG speed may be ramped at a rate that limits (e.g. holds a variable to a value less than the limit) torque converter output torque to less than a threshold torque until a predetermined condition occurs. In some examples, method 400 may remain at the first speed or at the DISG speed ramp rate until more than one condition occurs. For example, method 400 may hold DISG speed at the first speed until transmission pump output pressure reaches a threshold pressure and until the transmission input shaft and/or output shaft position changes a predetermined amount to indicate driveline lash has been reduced.

Method 400 may ramp DISG speed to a desired engine idle speed after one or more predetermined conditions occur. The DISG ramp rate may be based on driver demand torque. Further, in some examples, DISG speed may be ramped to a second speed greater than the first speed and less than the desired engine idle speed to further control driveline torque and lash removal during vehicle launch. The DISG profile speed may be adjusted for vehicle operating conditions. For example, the first and/or second speeds may be adjusted for ambient temperature and transmission oil temperature. Method 400 proceeds to 432 after DISG has been adjusted to a profile speed.

At 432, method 400 adjusts DISG speed to creep speed or a desired engine idle speed. Alternatively, method 400 may operate the DISG in a torque control mode based on driver demand torque. The DISG speed may be adjusted to a creep speed in response to release of a brake pedal and absence of accelerator pedal application. The DISG speed may be adjusted to a desired engine idle speed in response to a request to start the engine and driver demand torque less than a first threshold torque. The DISG may be operated in torque control mode when driver demand torque is greater than a second threshold torque, different from the first threshold torque. Additionally, the driveline disconnect clutch may be closed if engine torque is also requested. Method 400 proceeds to exit after adjusting DISG speed and/or torque.

In this way, a launch of a hybrid vehicle may be improved by first removing gear lash and space between gear clutch friction surfaces by controlling transmission pump outlet pressure. Further, while removing gear lash and space between gear friction surfaces, torque transfer from the torque converter impeller to the torque converter turbine is controlled such that less than a threshold amount of torque (e.g., torque less than torque to move the vehicle) is transferred so as to reduce the possibility of driveline torque disturbances. Once the lash and/or space between clutch friction surfaces is reduced torque transfer from the torque converter impeller to the torque converter turbine may be based on driver demand torque.

Thus, the method of FIG. 4 provides for a driveline method, comprising: adjusting an electric machine from zero speed to a first speed in response to a request to propel a vehicle and driveline lash; adjusting the electric machine to a second speed after achieving the first speed in response to the request to propel the vehicle. The method includes where an engine is at rest when the electric machine is adjusted to the first speed, and where the first speed is a pump pressurization speed, and where the pump pressurization speed is a lowest speed that a transmission pump outputs a desired pressure at a selected location in a transmission at a predetermined pump flow rate.

In some examples, the method further comprises adjusting the electric machine from zero speed to the first speed in response to a gear clutch that is not fully applied, and where the electric machine is adjusted to the second speed in further response to an outlet pressure of a pump. The method includes where the electric machine is adjusted to the second speed in further response to a non-zero predetermined amount of time since the first speed was achieved. The method includes where the first speed is less than the second speed. The method includes where the electric machine is held at the first speed until a predetermined conditions occurs. The method includes where the electric machine is ramped from the first speed to the second speed.

The method of FIG. 4 also provides for a driveline method, comprising: stopping an engine and an electric machine rotation in response to a request; opening or closing a driveline disconnect clutch in response to a battery state of charge and the request while stopping electric machine rotation; adjusting a speed of the electric machine from zero speed to a first speed and opening the driveline disconnect clutch in response to a request to propel a vehicle and driveline lash; and adjusting the electric machine to an engine idle speed after achieving the first speed in response to the request to propel the vehicle. The method includes where the driveline disconnect clutch is opened in response to battery state of charge being greater than a threshold battery state of charge. The method includes where the driveline disconnect clutch is closed in response to battery state of charge being less than a threshold battery state of charge.

In some examples, the method further comprises opening the driveline disconnect clutch in response to an indication of driveline lash. The method further comprises opening the driveline disconnect clutch in response to an indication of a gear clutch not being fully applied. The method includes where driveline lash is estimated via driveline position. The method further comprises ramping from the first speed to the engine idle speed. The method includes where the request to propel the vehicle is based on accelerator position.

As will be appreciated by one of ordinary skill in the art, the methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline method, comprising:
adjusting an electric machine from zero speed to a first speed in response to driveline lash and a request to propel a vehicle;
adjusting the electric machine to a second speed after achieving the first speed in response to the request to propel the vehicle.

2. The method of claim 1, where an engine is at rest when the electric machine is adjusted to a pump pressurization speed, and where the first speed is the pump pressurization speed, and where the pump pressurization speed is a lowest speed that a transmission pump outputs a desired pressure at a selected location in a transmission at a predetermined pump flow rate.

3. The method of claim 1, further comprising adjusting the electric machine from zero speed to the first speed in response to a gear clutch that is not fully applied and the request to propel the vehicle, and where the electric machine is adjusted to the second speed in further response to an outlet pressure of a pump.

4. The method of claim 1, where the electric machine is adjusted to the second speed in further response to a non-zero predetermined amount of time since the first speed was achieved.

5. The method of claim 1, where the first speed is less than the second speed.

6. The method of claim 1, where the electric machine is held at the first speed until a predetermined condition occurs.

7. The method of claim 6, where the electric machine is ramped from the first speed to the second speed.

8. A driveline method, comprising:
stopping an engine and an electric machine rotation in response to a request;
opening or closing a driveline disconnect clutch in response to a battery state of charge and the request;
adjusting a speed of the electric machine from zero speed to a first speed and opening the driveline disconnect clutch in response to a presence of driveline lash and a request to propel a vehicle; and
adjusting the electric machine to an engine idle speed after achieving the first speed in response to the request to propel the vehicle.

9. The method of claim 8, where the driveline disconnect clutch is opened in response to the battery state of charge being greater than a threshold battery state of charge.

10. The method of claim 9, where the driveline disconnect clutch is closed in response to the battery state of charge being less than the threshold battery state of charge.

11. The method of claim 10, further comprising opening the driveline disconnect clutch in response to the presence of driveline lash.

12. The method of claim 10, further comprising opening the driveline disconnect clutch in response to an indication of a gear clutch not being fully applied.

13. The method of claim 8, where an amount of driveline lash is estimated via subtracting a driveline position estimated after receiving the request to propel the vehicle from a driveline position estimated at a time the engine speed first reaches zero, and where the speed of the electric machine is adjusted from zero speed to the first speed in response to the amount of driveline lash exceeding a threshold value, and where the speed of the electric machine is adjusted from zero speed to the engine idle speed without remaining at the first speed for a predetermined duration in response to the amount of driveline lash not exceeding the threshold value.

14. The method of claim 8, further comprising ramping from the first speed to the engine idle speed.

15. The method of claim 8, where the request to propel the vehicle is based on accelerator position.

16. A driveline system, comprising:
an engine;
an electric machine;
a driveline disconnect clutch positioned between the engine and the electric machine; and
a controller including executable instructions stored in non-transitory memory for adjusting the electric machine from zero speed to a first speed in response to a request to propel a vehicle and a gear clutch being at least partially open.

17. The driveline system of claim 16, further comprising additional instructions for ramping the electric machine to a second speed in response to output pressure of a transmission pump.

18. The driveline system of claim 17, further comprising additional instructions for closing the driveline disconnect clutch after the electric machine achieves the second speed.

19. The driveline system of claim 16, where the driveline disconnect clutch is open when the electric machine is adjusted from zero speed to the first speed.

20. The driveline system of claim 16, further comprising additional instructions for adjusting the electric machine from zero speed to the first speed in response to the request to propel the vehicle and driveline lash.

* * * * *